United States Patent

[11] 3,553,465

| | | | |
|---|---|---|---|
| [72] | Inventor | Merle E. Martin |  |
|  |  | Dallas, Tex. |  |
| [21] | Appl. No. | 756,548 |  |
| [22] | Filed | Aug. 30, 1968 |  |
| [45] | Patented | Jan. 5, 1971 |  |
| [73] | Assignee | Koppers Company, Inc. |  |
|  |  | a corporation of Delaware |  |

[54] ELECTRONIC COUNTER FOR COUNTING SERIALLY ADVANCING OSCILLATING OBJECTS
4 Claims, 3 Drawing Figs.

[52] U.S. Cl....................................................... 250/223, 250/209
[51] Int. Cl........................................................ G06m 7/00, H01j 39/12
[50] Field of Search............................................ 250/223, 219Lg, 209, 221, 222, 208

[56] References Cited
UNITED STATES PATENTS
2,916,633  12/1959  Stone et al. .................... 250/223
3,061,732  10/1962  Milnes............................ 250/219
3,242,342  3/1966  Gabar.............................. 250/223
3,327,850  6/1967  Simmons........................ 250/223X Primary Examiner—Roy Lake
Assistant Examiner—V. Lafranchi
Attorney—Oscar B. Brumback, Boyce C. Dent and Olin E. Williams ABSTRACT: Objects which tend to oscillate about their centers of gravity are counted as the objects move in a line of travel past a zone comprised of a pair of transmitters on one side of the line of travel and a pair of receivers on the other side. A signal memory and processing circuit connects the receivers to registers for indicating the count. The circuit responds only to the simultaneous blocking of the transmission to the receiver and not to the blocking of a single receiver.

INVENTOR.
MERLE E. MARTIN

INVENTOR.
MERLE E. MARTIN

ELECTRONIC COUNTER FOR COUNTING SERIALLY ADVANCING OSCILLATING OBJECTS

This invention relates to a system for the counting of objects such as barrels, which rock or oscillate about their center-of-gravity axis as they move on a conveyor or other transport mechanism. Such objects are difficult to count by the heretofore known counting systems because the rocking or oscillation of an object tends to alternately actuate the counting unit. In accordance with this invention, it has been found that a correct count may be obtained by using two sensing units and properly storing and processing the sequenced interruptions of both sensing units as the object travels completely through the counting zone; the two sensing units being so displaced that the oscillatory motion of the object does not permit the alternate opening and closing of both beams simultaneously. Using optical sensing units, for example, the spacing of the beams must be less than the smallest dimension of the object along the line of travel. In the preferred embodiment, a series of steps takes place wherein (1) the first optical beam is interrupted by the advancing object; (2) both optical beams are thereafter simultaneously interrupted by the same advancing objects; (3) the first beam is thereafter transmitted to its receiver caused by the object at least momentarily passing by the first beam; and (4) the second beam is thereafter transmitted to its receiver caused by the object at least momentarily passing by the second beam. Upon the completion of these four steps, a counting pulse is applied to an indicating means and counting circuitry is reset in preparation for the counting of the next object.

This invention contemplates a counter for counting objects which tend to oscillate about their centers of gravity as the objects move along a line of travel, comprising: first and second transmitters spaced along one side of the line of travel of the object, respectively, first and second receivers spaced along the other side of the line of travel to receive respective signals from the transmitters, the spacing of the transmitters and receivers along the line of travel being such that an object moving along the line of travel will simultaneously block reception of both receivers, a register for indicating the counting of successive ones of objects each time the reception by both receivers is blocked simultaneously by one of the objects, and means connecting the receivers and register for storing and processing the sequenced interruptions of the receivers including first and second channels. Each channel includes a signal conditioner responsive to an associated receiver, a gate, and a flip-flop. These channels actuate a further gate which in turn actuates the switch for the register. As the switch actuates the register, it resets the flip-flops for the succeeding count.

The foregoing and other advantages of the invention will become more readily understood from the following detailed description wherein.

Figure 1:
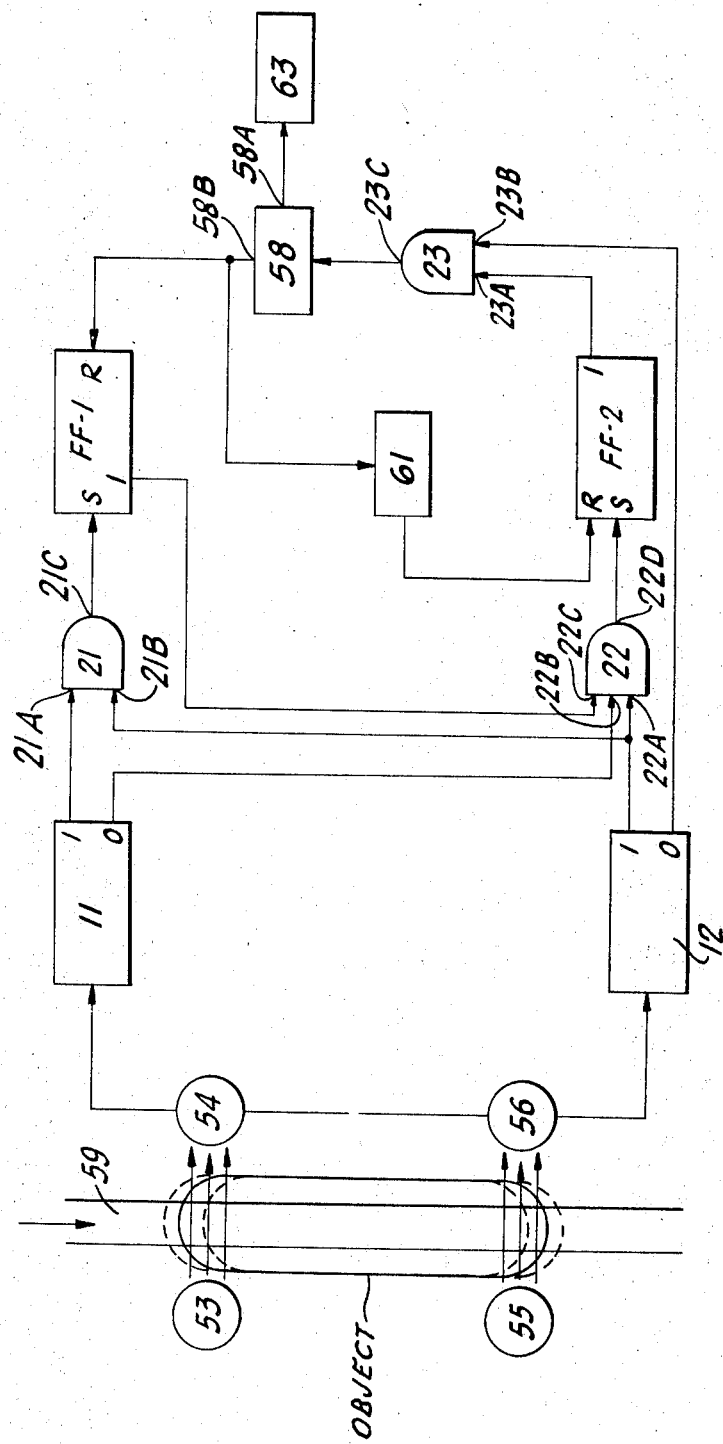
FIG. 1 is a block display of the logic system of an embodiment of the invention.

Referring now to FIG. 1, the novel system of this invention for counting objects, illustrated herein as barrels, which tend to oscillate about their centers of gravity as the objects move along a line of travel is illustrated in the form of a logic circuit.

First and second light sources or transmitters 53 and 55 are spaced along a conveyor 59 which constitutes the line of travel of the objects.

First and second receivers 54 and 56 are spaced on the opposite sides of the conveyor to receive respective signals from the transmitters. The spacing of these transmitters 53, 55 along the line of travel is a distance such that an object will simultaneously block reception of said signals by said receivers and yet can block the reception of one receiver without blocking the reception of the other.

The register 63 indicating the successive ones of the objects each time the reception of signals by both receivers is blocked simultaneously by one of said objects may be a conventional electromechanical mechanism whose count is advanced one number each time the register is pulsed. The number may be visually indicated by a dial.

The means for storing and processing the information concerning the interruptions is illustrated as being comprised of two channels. The first channel includes a first signal conditioner 11 responsive to the first receiver 54 and having first output 11-0 and second output 11-1, a first gate 21 having a first input 21-A and second input 21-B and an output 21-C, and a first flip-flop FF-1 with an input FF-1S for receiving the output 21C of first gate 21 for developing an output FF-1-1. The second channel includes a second signal conditioner 12 responsive to the second receiver 56 and having first and second outputs 12-1, and 12-0; a second gate 22 having a first input 22-A for receiving the first output of second signal conditioner 12, a second input 22-B for receiving the O output from signal conditioner 11, and third input 22-C for receiving the output from first flip-flop FF-1 and developing an output at 22-D; a second flip-flop FF-2 for receiving the output 22-D of second gate 22 at input FF-2S for developing an output at FF-2-1; and a third gate 23 responsive to the second output 12-0 of signal conditioner 12 at input 23-B and the output FF-2-1 from second flip-flop FF-2 at input 23-A to develop an output at 23-C. A switch 58 in response to the output 23-C from third gate 23 develops at output 58-A a counting pulse for electromechanical counter 63 and at output 58-B a pulse which is sent to input FF-1-R and to input FF-2-R for resetting each flip-flop. The pulse from switch 58 to input FF-2-R goes through a time delay 61 for the delaying of the resetting of second flip-flop FF-2.

As a barrel travels through the count station from left to right as indicated by the arrow, the barrel passes between transmitter 53 and receiver 54. The light beam to optical receiver 54 will be broken, causing a "1" output from signal conditioner 11 to be applied to input 21-a of gate 21. As the barrel progresses further onwardly and in front of transmitter 55, light to optical receiver 56 will be interrupted, causing a "1" output from signal conditioner 12. This output from 12-1 is applied to both the input 21-B of gate 21 and the input 22-A of gate 22. Since the barrel is now interrupting both optical receivers 54 and 56, a "1" appears at the two inputs 21A and 21B of gate 21; this opens gate 21, provides an output from 21C to input FF-1S and "sets" flip-flop FF-1. A "1" output from output FF-1-1 of flip-flop FF-1 is then applied to the input 22C of gate 22. As the barrel continues its movement, it passes beyond and no longer interrupts the reception of optical receiver 54; signal conditioner 11 changes state, and a "1" output appears at the output 11-0 and is applied to input 22B of gate 22. Now, all three inputs to gate 22 are "1's" and the gate opens to provide an output at 22D to FF-2S to "set" flip-flop FF-2. Upon "setting," the flip-flop FF-2 provides a "1" output to the input 23A of gate 23; but the other input 22B from signal conditioner 12 is still a "0" output. As soon as the barrel passes optical receiver 56, the reception of the receiver is restored and the "0" output of signal conditioner 12 becomes a "1" to input 23B and gate 23 is opened. The output 23C from gate 23 now applied to switch 58 turns on switch 58 to supply an output at 58A to the electromechanical register 63. Switch 58 also generates a reset output at 58B for application to inputs R of flip-flops FF-1 and FF-2. This output immediately resets flip-flop FF-1 but is delayed to flip-flop FF-2 by the time delay 61 to allow flip-flop FF-2 and consequently gate 23 to be on long enough to operate the electromechanical register 63. Upon reset of flip-flops FF-1 and FF-2, the foregoing cycle can be repeated for the counting of the next barrel even though the subsequent barrel may already be blocking the light reception by optical receiver 54.

Figure 2:
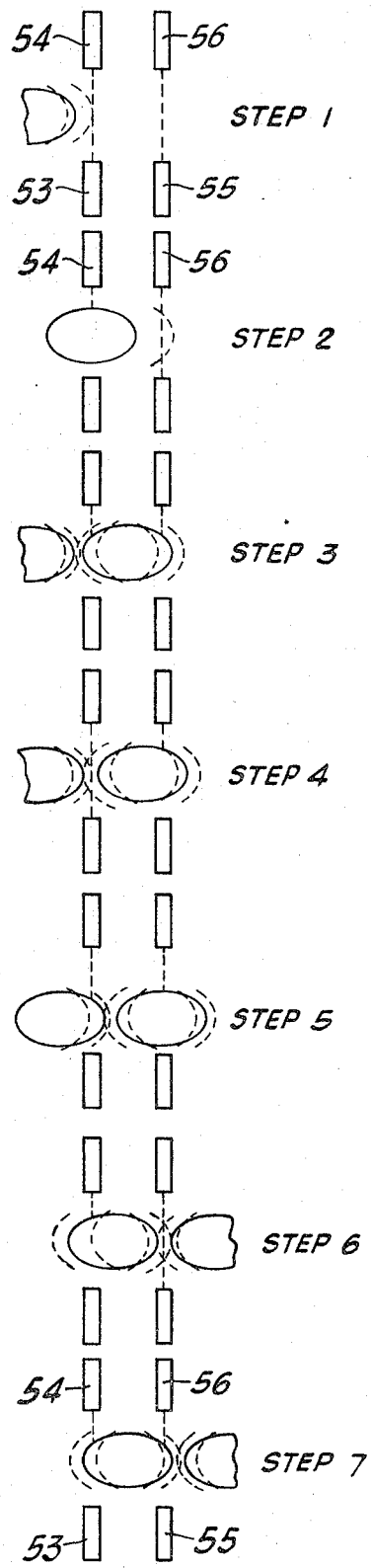
FIG. 2 is a schematic illustration of the travel of objects through the counting arrangement of FIG. 1.

Referring now to FIG. 2, one embodiment of the logic circuit of FIG. 1 is illustrated as a solid-state system utilizing conventional and well-known electronic circuits as elements. One channel is comprised of the signal conditioner which is illustrated as a Schmitt trigger comprised of transistors Q1 and Q2, a first gate comprised of transistor Q3 and a first flip-flop comprised of transistors Q4 and Q5 in a bistable circuit arrangement. The second channel includes a second Schmitt trigger comprised of transistors Q9 and Q10, a second gate comprised of transistor Q11, and a second flip-flop comprised of transistors Q12 and Q13 in a bistable circuit arrangement. Switch 58 comprises a conventional driver circuit including transistors Q7 and Q8; a third gate, comprising transistor Q6 turns switch 58 on and off. The transistor Q14 resistor capacitor arrangement C-5 and R 50 provide the time delay in the resetting of the flip-flop circuit comprised of transistors Q11 and Q12.

Figure 3:
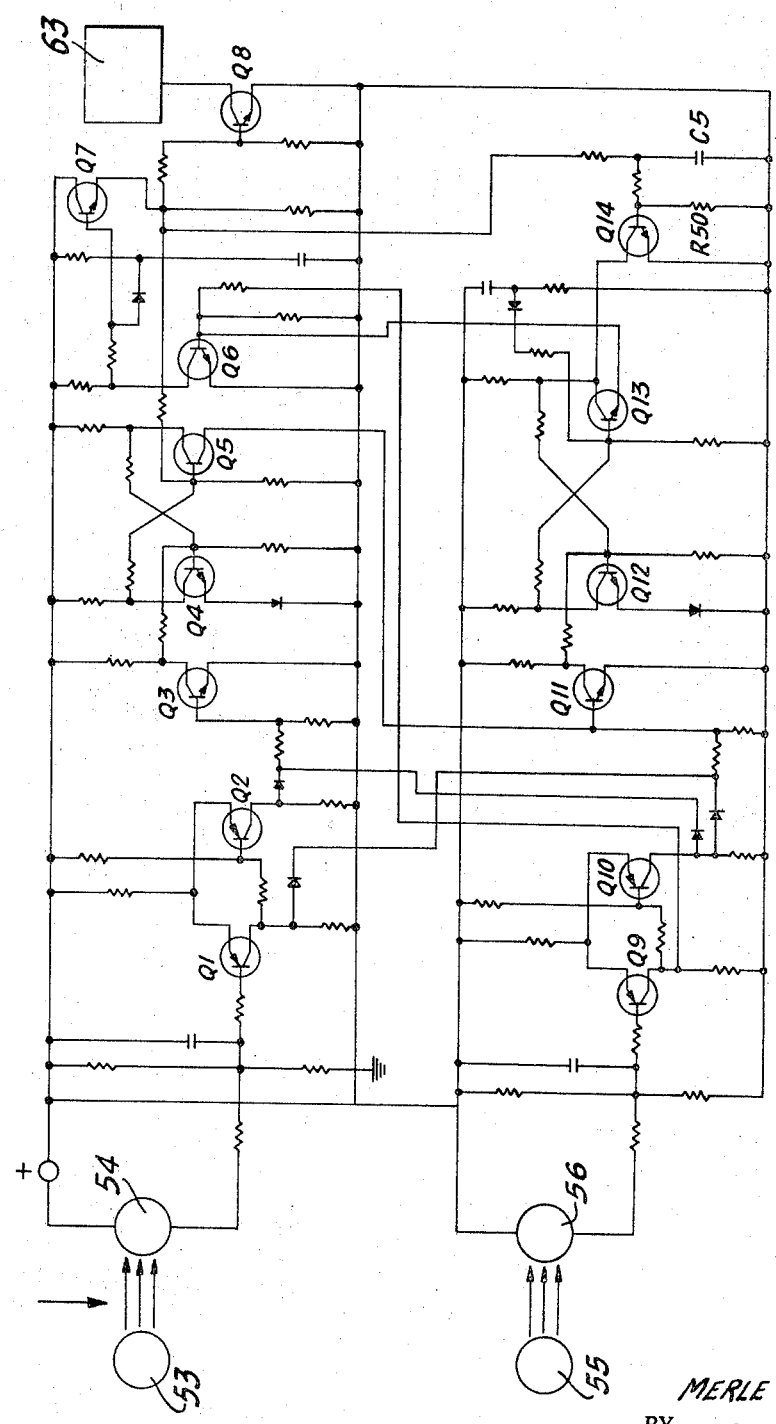
FIG. 3 is a schematic diagram of a solid-state system of an embodiment of the invention illustrated in FIG. 1.

For purposes of convenience, the paths of two successive barrels between the transmitters 53 and 55 and the receivers 54 and 56 has been divided into a sequence of seven consecutive events which is illustrated in FIG. 3. The curved dashed lines represent possible oscillation and the straight dashed lines represent the light beam. In this way the various possibilities of interception of the light beams are shown as succeeding barrels move past the beams. The following chart gives the state of each transistor of FIG. 2 during each event depicted in FIG. 3.

OBJECT COUNTER TRANSISTOR STATES DURING COUNTING

| Step No. (Event) | Q1 | Q2 | Q3 | Q4 | Q5 | Q6 | Q7 | Q8 | Q9 | Q10 | Q11 | Q12 | Q13 | Q14 | |
|---|---|---|---|---|---|---|---|---|---|---|---|---|---|---|---|
| Step 1 | Off | On | On | Off | On | On | Off | Off | Off | On | On | Off | On | Off | |
| Step 2 | On | Off | On | Off | On | On | Off | Off | Off | On | On | Off | On | Off | Object moving from Q1 to Q9. |
| Step 3 | On | Off | Off | On | Off | On | Off | Off | On | Off | On | Off | On | Off | |
| Step 4 | Off | On | On | Off | Off | On | Off | Off | On | Off | On | Off | On | Off | |
| Step 5 | On | Off | On | Off | Off | On | Off | Off | On | Off | On | Off | On | Off | |
| Step 6 | On | Off | On | On | Off | Off | On | On | Off | On | On | On | Off | On | Object count, circuit reset for next object count. |
| Step 7 | Off | On | On | Off | On | On | Off | Off | Off | On | On | Off | On | Off | |

The foregoing has presented a novel arrangement for counting objects movable along a conveyor when such objects tend to oscillate about their own centers of gravity. The novel system perceives such oscillations yet, by a memory process responds only to the actual number of objects passing the counting zone.

I claim:

1. A counter for counting objects which tend to oscillate about their centers of gravity as the objects move along a line of travel, comprising:
   first and second transmitters spaced along said line of travel;
   first and second receivers spaced along said line of travel adapted to receive respective transmitter signals from said transmitters across said line of travel;
   said transmitters being spaced along said line of travel a distance equal to or less than the dimension of said objects extending substantially parallel to said line of travel whereby said object can simultaneously interrupt reception of said signals by both of said receivers or selectively interrupt the reception of one said receivers;
   indicator means solely responsive to sequential;
   interruption of reception of said first transmitter signal by said object;
   subsequent interruption of reception of said second transmitter signal simultaneously with an interruption of reception of said first transmitter signal by said object;
   subsequent reception of said first transmitter signal by its respective receiver caused by said object at least momentarily passing said first transmitter; and
   to subsequent reception of said second transmitter signal by its respective receiver caused by said object at least momentarily passing said second transmitter, for providing an indication on said indicator means.

2. The apparatus of claim 1 wherein said counter includes first and second channels:
   said first channel comprising a first signal conditioner responsive to said receiver and having first and second outputs;
   a first gate having first and second inputs and an output, and a first flip-flop receiving the output of said first gate for developing an output, said second channel comprising:
   a second signal conditioner responsive to said second receiver and having first and second outputs,
   a second gate having a first input for receiving the first output of said second signal conditioner, a second input for receiving the second output of said first signal conditioner, and a third input for receiving the output from said first flip-flop and developing an output, and a second flip-flop for receiving the output of said second gate for developing an output;
   a third gate responsive to the second output of said second signal conditioner and the output from said second flip-flop to develop an output; and
   a switch responsive to the output from said third gate for developing a counting pulse and a reset pulse, and said indicator means responsive to said counting pulse for providing said one indication, said reset pulse operative to reset each of said flip-flops.

3. The apparatus of claim 2 including a time delay between said switch and said second flip-flop for delaying the resetting of said second flip-flop.

4. A counter for counting objects which tend to oscillate about their centers of gravity as the objects move along a line of travel, comprising:
   first and second light transmitters spaced along said line of travel;
   first and second light receivers spaced along said line of travel adapted to receive respective signals from said transmitters across said line of travel;
   said transmitters spaced along said line of travel a distance such that an object may interrupt only one or simultaneously interrupt the reception of both of said signals by said receivers; and
   an electromechanical register for denoting successive ones of said objects in response to sequential:
   interruption of reception of said first transmitter signal by said object,
   subsequent interruption of reception of said second transmitter signal simultaneously with an interruption of reception of said first transmitter signal by said object,
   subsequent reception of said first transmitter signal by its respective receiver caused by said object at least momentarily passing said first transmitter, and
   to subsequent reception of said second transmitter signal by its respective receiver caused by said object at least momentarily passing said second transmitter;
   means connecting said receivers and said register including first and second channels;
   said first channel comprising a Schmitt trigger circuit responsive to said first receiver and having first and second outputs:
   a first gate transistor having first and second inputs and an output, and
   a first flip-flop comprised of a pair of transistors in a bistable circuit for receiving the output of said first gate for developing an output;
   said second channel comprising:
   a second Schmitt trigger circuit responsive to said second receiver and having first and second outputs;

a second gate transistor having a first input for receiving the first output of said second Schmitt trigger circuit, a second input for receiving the second output of said first signal conditioner and a third input for receiving the output from said first flip-flop and developing an output;

a second flip-flop comprised of a pair of transistors in a bistable circuit arrangement receiving the output of said second gate transistor for developing an output;

a third gate transistor responsive to the second output of said second Schmitt circuit and the output from said second flip-flop to develop an output;

a switch comprised of a pair of transistors responsive to the output from said third gate transistor for developing a counting pulse on the second of said pair for operating said indicator means; and a reset pulse on the second of said pair for resetting each of said flip-flops.